June 25, 1940. K. STEIMEL 2,205,582

METHOD OF SEALING GLASS

Filed Dec. 18, 1937

INVENTOR.
KARL STEIMEL
BY Charles McClair
ATTORNEY.

Patented June 25, 1940

2,205,582

UNITED STATES PATENT OFFICE 2,205,582

METHOD OF SEALING GLASS

Karl Steimel, Berlin-Steglitz, Germany, assignor to Telefunken Gesellschaft für Drahtlose Telegraphie m. b. H., Berlin, Germany, a corporation of Germany Application December 18, 1937, Serial No. 180,508
In Germany November 30, 1936

2 Claims. (Cl. 49—81)

The invention relates to a method for uniting or sealing glass parts together by welding or partial fusion.

The usual practice in joining glass parts or embedding metallic parts in glass is to soften the glass by flame heating. However, this practice has disadvantages in that parts of the electrode system, especially the cathode, may be damaged as a result of such heating or of the chemical action of the flame gases. The risk of such damage is greatest when the place of fusion or welding is very close to the electrode system, which is the case in all tubes of small dimensions and where short electrode leads are particularly desired or required.

The primary object of the invention is to provide a method of joining or sealing glass parts which is free from the disadvantages arising from flame heating of the glass and which, in addition, has some advantages peculiar to and inherent in the method.

According to the invention the fused junction between two glass parts is made by creating at the junction or seal a powerful high frequency field which will cause such high dielectric losses in the glass parts that they will soften and can be sealed or united by presure.

Figure 1:
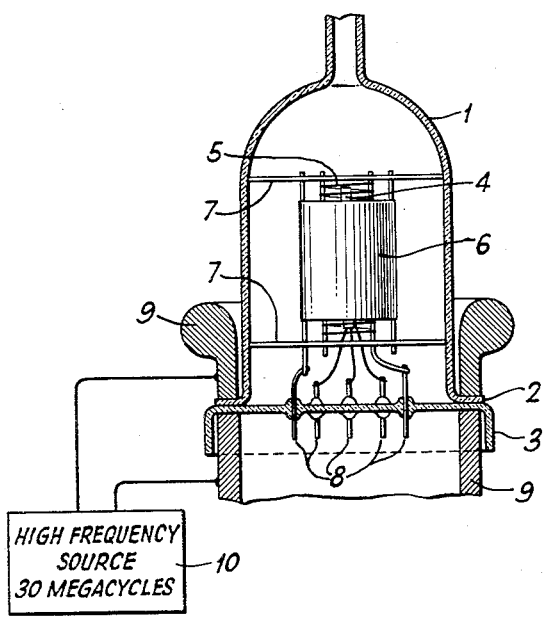
Figure 2:
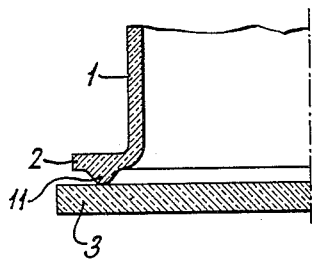
Figure 3:
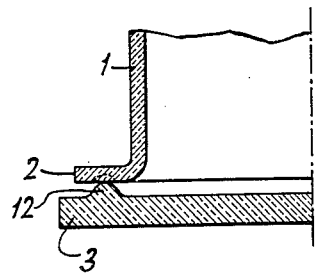

For a more complete explanation of the invention, reference is made to the accompanying drawing in which Figure 1 illustrates the sealing of a radio tube in acordance with the invention, and Figures 2 and 3 are fragmentary views in cross-section showing the parts to be sealed in various forms which facilitate sealing.

The embodiments of the invention shown in the appended drawing as illustrative examples relate more particularly to the application of the invention to the problem of closing or sealing a glass bulb by sealing a cover or stem to the open end of the bulb. Figure 1 shows a radio tube comprising a glass bulb 1 which has at its open end a flange 2, and at the opposite end a tubular nipple or exhaust tube. The bulb 1 is made into a vacuum tube by adding to it the cover or stem 3 upon which is mounted an electrode system or assembly comprising a cathode 4, a grid 5 and a plate 6. Two insulating bridge pieces or mica spacers 7 serve, on the one hand, to hold the electrode assembly together, and also, on the other hand, to support and steady the electrode assembly inside the bulb. Embedded in or sealed into the stem 3 are lead-ins 8, to which the electrode supports may be secured by welding. The tube may be assembled by first fixing the lead-ins in the cover or stem; then the electrode assembly is mounted on the lead-ins, to form a mount, and finally the mount is placed in the bulb. The conventional procedure in making vacuum-tight closure or seal for the tube is to soften the flange 2 and the edge or margin of the stem 3 in a blow pipe flame and then squeeze these parts together. Another procedure sometimes used is to paint the glass surfaces at the joint with a glass flux having a melting point lower than that of the glass of the bulb and stem, then soften the flux in the flame, and joining the parts by applying pressure. Either procedure permits the flame gases to have access to the electrode system, and exposes the electrodes to attack by the gases. This disk and danger is particularly serious for the cathode, and, in fact, for all coated electrodes, such as those coated with layers of carbon for increasing the heat radiating properties for suppressing secondary electron emission, or with other coatings for promoting emission of secondary electrons. There is also the disadvantage that the heating of the glass parts lasts a comparatively long time and that the action and application of the heat even where focused blowpipe flames are employed is not confined to the weld or junction, so that the heating spreads over to and includes adjacent regions, with the risk that other and already completed seals, such as those at the lead-ins 8, may be injured and made leaky.

Now, according to this invention, the glass surfaces to be joined are heated by a high or radio frequency field set up at the sealing point in such a way that dielectric losses in the glass heat the glass surfaces to welding or fusion temperature. To this end, a pair of electrodes 9 which match the form of the seal and which in the embodiments shown are cylindrical in form, may be laid upon the glass parts properly fitted together and then connected with a source 10 of potential of radio frequency, such as several megacycles. In order to make the dielectric losses in the glass as high as possible, extremely high frequencies of 30 megacycles and higher, such as short or ultra-short waves of the kind used in the radio communication art, should be used. The value of the applied potential is dependent upon the size of the junction, the thickness of the glass parts to be joined together, and also the dielectric properties of the glass and, as a general rule, will vary between one hundred volts and several thousand volts. The heating of the glass to the softening temperature occurs rather quickly, and as soon as softening has occurred, the parts to be united are pressed together. To this end, the electrodes 9 are preferably so shaped as to be capable of acting at the same time as the jaws of a press or squeezing device. Merely for illustration, the upper or movable electrode is shown as of sufficient size and weight to exert enough pressure by gravity to press the heated glass firmly between the movable upper and fixed lower electrode.

By selecting suitable forms for the electrodes, it is feasible to concentrate the field and the heating effects at the sealing point, and the concentration or focusing of the high frequency field may be further enhanced by means of special forms of joining places or areas. For example, in Figure 2 the flange 2 of the bulb has an annular torus or collar portion 11 for causing particularly rapid heating of the joint as the high frequency field will concentrate primarily at the torus because the air gaps on both sides will present a higher resistance than the torus. In Figure 3 the stem 3 has a similar torus or collar 12, whereas the flange 2 is smooth. It is obvious that a shallow groove in the surface facing or opposite the collar, as indicated by dash lines in Figure 3, may also be provided to facilitate joining together of the two parts.

The method of using dielectric heating as here disclosed is useful and advantageous, not only in making vacuum-tight joints in a vacuum vessel, but in making glass seals of any kind, nor is it restricted to any particular form of the places or areas to be welded together.

I claim:

1. The method of welding two glass parts by fusion in juncture which includes positioning said parts with the welding surfaces contiguous throughout a zone of contact, applying to the glass parts on opposite sides of the zone of contact a pair of electrodes substantially coextensive with the contiguous surfaces producing between the electrodes and through the glass in the zone of contact an ultra high frequency discharge to heat all of the contiguous glass surfaces to incipient fusion by dielectric losses in the glass, and pressing the glass parts together between the electrodes to weld the heated surfaces in juncture.

2. The method of electrically welding by fusion in juncture a glass part having an annular flange to a glass member having an annular sheet portion coextensive with said annular flange which consists in placing said glass member contiguous with and overlapping said flange to provide an annular zone of contact of said member and said part coextensive with the annular surface of said flange, applying to said flange and said member on opposite sides of said zone of contact annular electrodes coextensive with said flange, producing between said annular electrodes an ultra high frequency electrical discharge to heat the glass of said flange and of said part at said zone of contact and welding the annular flange and glass member to each other over the heated zone of contact by pressing them together between the electrodes.

KARL STEIMEL.